UNITED STATES PATENT OFFICE.

EDWARD C. BRICE, OF WASHINGTON, DISTRICT OF COLUMBIA.

MANUFACTURE OF ARTIFICIAL STONE, BRICK, &c.

SPECIFICATION forming part of Letters Patent No. 555,206, dated February 25, 1896.

Application filed June 24, 1895. Serial No. 553,882. (No specimens.)

*To all whom it may concern:*

Be it known that I, EDWARD C. BRICE, a citizen of the United States, residing at Washington, in the District of Columbia, have invented certain new and useful Improvements in the Manufacture of Stone, Brick, &c.; and I do hereby declare the following to be a full, clear, and exact description of the invention, such as will enable others skilled in the art to which it appertains to make and use the same.

My invention is an improvement in the manufacture of building-brick, paving-brick, fire-brick, and building-stone, and for other purposes, as those in which natural stone or burned brick is used.

My invention consists in the composition of matter hereinafter set out.

In carrying out my invention I take common sand, two hundred and ninety-six pounds; common clay, one hundred and forty-eight pounds; common salt, one hundred and forty-eight pounds; sal-soda, four hundred pounds. These substances are thoroughly mixed together and preferably placed in a suitable iron pan and dried. This material is ground to a powder and placed in a furnace suitable for the purpose, and thereafter the furnace is brought up to a heat sufficient to fuse the mass. As soon as the material above specified has been reduced to a liquid condition by heat it is drawn off from the furnace and cooled. This mass is then ground to a very fine powder.

The above constitutes the first part in the procedure, which consists in the manufacture of a bond to be used in the second part of the procedure.

Second. I take one part of the above-described material, which I call the "bond," composed of a fused mixture of sand, clay, salt, and sal-soda and three parts of common sand and one part of common clay, all in a powdered condition. These ingredients are thoroughly mixed together in a suitable vessel, where water is added in sufficient quantities to make the mixed ingredients moist. This mass is then molded under pressure into any desired size or shape. The molded forms are then carried into a suitable furnace and burned at a red heat, and when cool are a finished product and are ready for use in the construction of buildings, furnaces, and paving streets.

I may vary the proportion of the flux used as the bond, as well as the ingredients used as the filler—for instance, in the manufacture of fire-brick, where a great degree of hardness is not essential and a great resistance to a high degree of heat is required. I take one part of the flux or bond described and nine parts of fire-clay or an earth known as "white silica." These ingredients are compounded, mixed, pressed, and burned in the same manner as the building or paving brick; but the finished product is of a softer character, which adapts this brick for use in the interior linings of furnaces. The fire-clay or the earth (powdered silica) is an equivalent to the sand and clay used in the building and paving brick in this process, the difference being that this brick when finished is an open porous mass which is required in a fireproof material, while building and paving brick must be of a hard non-porous solidified mass or stone.

I may use, instead of the three parts of sand and one of clay described in the second step of the process as the filler, powdered earth or stone, these two ingredients being an equivalent to the sand and clay described as the filler.

Having described my invention, what I claim is—

1. A composition of matter for a bond for making bricks and similar articles, consisting of sand; clay; salt and sal-soda in the proportions stated, as set forth.

2. The composition of matter, consisting of sand; clay; salt and sal-soda in the proportions stated; and a mineral filler in the proportions stated, as set forth.

In testimony whereof I affix my signature in presence of two witnesses.

EDWARD C. BRICE.

Witnesses:
 SAML. A. DRURY,
 R. A. MORRISON.